United States Patent
Lo et al.

(10) Patent No.: US 11,652,780 B2
(45) Date of Patent: May 16, 2023

(54) ADDRESS RESOLUTION PROTOCOL (ARP) FOR MULTI-HOMED DEVICES

(71) Applicant: Arista Networks, Inc., Santa Clara, CA (US)

(72) Inventors: Alton Lo, Freemont, CA (US); Rajesh Semwal, Sunnyvale, CA (US); Saurabh Sarpal, Cupertino, CA (US); Kallol Mandal, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/398,301

(22) Filed: Aug. 10, 2021

(65) Prior Publication Data

US 2023/0050404 A1 Feb. 16, 2023

(51) Int. Cl.
*H04L 61/10* (2022.01)
*H04L 41/12* (2022.01)

(52) U.S. Cl.
CPC .............. *H04L 61/10* (2013.01); *H04L 41/12* (2013.01)

(58) Field of Classification Search
CPC ............ H04L 61/10; H04L 9/40; H04L 41/12
See application file for complete search history.

(56) References Cited

U.S. PATENT DOCUMENTS

| 2016/0255043 | A1* | 9/2016 | Mahadevan | ........ H04L 67/1095 709/245 |
| 2021/0377207 | A1* | 12/2021 | Ghanwani | ............. H04L 61/103 |

* cited by examiner

Primary Examiner — Schquita D Goodwin
Assistant Examiner — Joseph M Cousins
(74) Attorney, Agent, or Firm — Sprinkle IP Law Group

(57) ABSTRACT

A method for synchronizing a binding process among a group of network devices connected to a server that is multi-homed to the group of network devices in provided. The method is executed by a first network device among the group of network devices and includes: receiving, from the server, network traffic associated with a host executing on the server; configuring, using the network traffic, a binding between the first network device and the host and setting a binding status of the first network device for the host to a first status; and transmitting, in response to the setting and via an out-of-band (OOB) channel to a second network device among the plurality of network devices, first binding instructions for causing the second network device set a binding status of the second network device for the host to a second status different from the first status.

20 Claims, 12 Drawing Sheets

ADDRESS RESOLUTION PROTOCOL (ARP) FOR MULTI-HOMED DEVICES

BACKGROUND

All-active multihoming (A-A MH) configurations offer efficient bandwidth utilization between inter-connected network devices. In network deployments utilizing an A-A MH configuration, a computing device hosting virtual machines may be configured as a multi-homed device (i.e., a multi-homed host) and connected to multiple other devices on a network. Typically, these network devices connected to the multi-homed host are configured as load balanced network devices.

DETAILED DESCRIPTION

When multi-homed hosts are connected to load balanced network devices (e.g., load balanced switches), significant quantities of computing resources may be expended for connectivity discovery purposes. For example, each of the network devices may need to maintain separate bindings for the multi-homed host. Consequently, each of the network devices may separately execute an address resolution protocol (ARP) to maintain these bindings.

Additionally, because the network devices are load balanced, each network device is unable to ensure that they will receive responses to requests for bindings (e.g., ARP bindings). Rather, a network device that did not request the bindings may receive the bindings intended for another network device because, from the perspective of the multi-homed host, all of the network devices may be the same device and responding to any one of which satisfies its duty for servicing a binding request.

One or more embodiments of the present disclosure relate to systems, devices, and methods for synchronizing a binding process (i.e., an address resolution (protocol) binding process) to reduce the quantity of computing resources expended for network discovery. To do so, the duty of obtaining bindings for a multi-homed host may be delegated to a single network device (e.g., a network device that "owns" a binding) (herein referred to as "an ARP owner"). When bindings for the multi-homed host are obtained, the other hosts may be notified through out-of-band communications. Consequently, duplicative effort for obtaining the bindings may be avoided.

To prevent duplicative effort, only the ARP owner maintains a dynamic binding that requires periodic updates. In contrast, the other network devices may each maintain a static binding that does not require periodic updates. The static bindings may only be updated based on out-of-band (OOB) messages received from the ARP owner. Each of the network devices may only periodically update their dynamic bindings thereby ensuring that only a single network device at any time is tasked with updating the bindings for the group.

By doing so, the quantity of communications required to update the bindings in all of the network devices may be greatly reduced. Consequently, the amount of resources (i.e., central processing unit (CPU) resources) expended by these network devices to update and maintain these bindings are also greatly reduced; thereby advantageously providing a direct improvement in the computer functionalities of each of these network devices.

Various embodiments of the disclosure are described below.

Figure 1A:
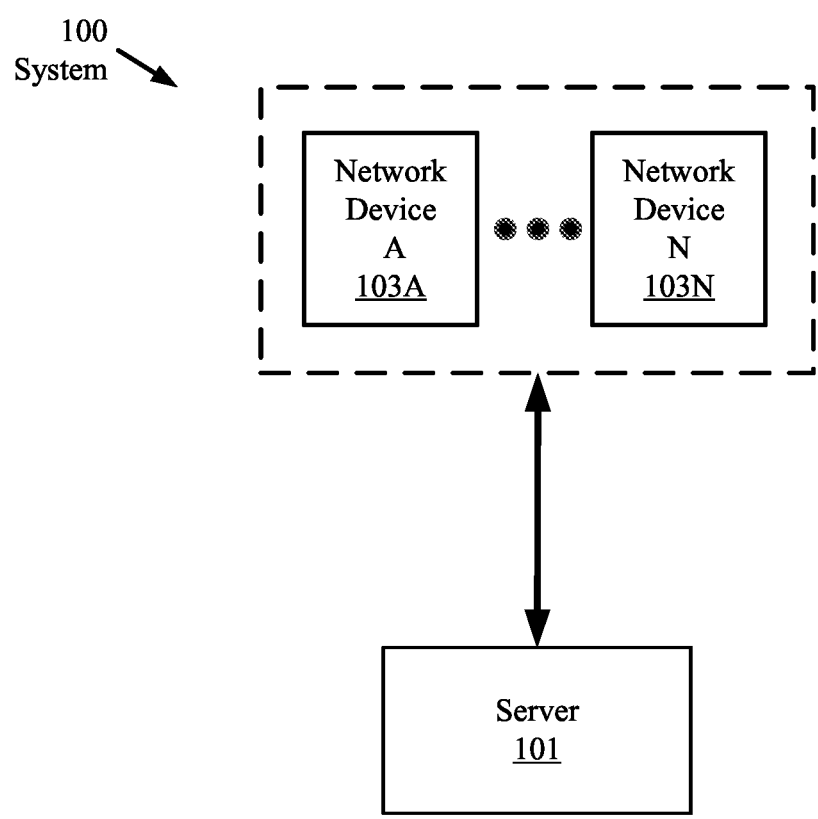
FIG. 1A shows a system in accordance with one or more embodiments described herein.

FIG. 1A shows a system (100) in accordance with one or more embodiments of the disclosure. The system (100) includes a server (101) connected to one or more network devices (103A, 103N) operating on a network (not shown). Each of these components is described below.

In one embodiment of the disclosure, the server (101) may be any device that includes functionality to: (i) transmit packets towards the network devices (103A, 103N); (ii) receive and process packets from the network devices (103A, 103N); and (iii) host one or more virtual machines (i.e., hosts) executing on the server (101). For example, the server (101) is a computing device (see, e.g., FIG. 4) operating as a bare metal server including physical ports that are each connected to one of the network devices (103A, 103N).

The server (101) may be multi-homed to the network devices (103A, 103N) using an Ethernet Segment (ES) (not shown). In particular, the server (101) may communicate with each of the network devices (103A, 103N) via active links that are part of the ES. From the perspective of the server (101), the links to network devices (103A, 103N), which are part of the ES, appear as a link aggregation group (LAG). When the network devices (103A, 103N) are configured to support multihoming for the hosts executing on the server (101), they are associated with an Ethernet VPN Instance (EVI).

When a customer site (e.g., one of the hosts executing on server (101)) is connected to one or more provider edges (e.g., network devices (103A, 103N)) via a set of Ethernet links, then this set of Ethernet links constitutes an "Ethernet segment." Additionally, the link between the network devices (103A, 103N) and the server (101) is considered active when the network devices (103A, 103N) can transmit packets directly to the server (101) via the link. However, if the network device (103A, 103N) cannot transmit packets directly to the server (101) via the link, then the link is deemed to be inactive even though there is still a direct physical connection (i.e., the link) between the network devices (103A, 103N) and the server (101).

In the context of one or more embodiments of this disclosure, the host may be a virtual machine (VM) executing on the server (101). When multiple VMs are executing on the server (101), the VMs may be using (e.g., transmitting and receiving packets via) the same Ethernet port and thus all of the VMs will be on the same ES.

Additional details about the server (101) are described below with respect to FIG. 1C.

In one embodiment of the disclosure, the one or more network device(s) (103A, 103N) are physical devices that include persistent storage, memory (e.g., random access memory), one or more processor(s) (including a switch chip), and two or more physical ports. Examples of the network devices (103A, 103N) include, but are not limited to, a router, a switch, a top of rack (TOR) switch, and a multilayer switch. The network devices (103A, 103N) are not limited to the aforementioned specific examples.

The switch chip is hardware that determines which egress port on a network device (103A, 103N) to forward packets (which may be in the form of media access control (MAC) frames). The switch chip may include egress and ingress ports that may connect to ports on the network device (103A, 103N). Each port may or may not be connected to another device (e.g., a server, a switch, a router, etc.). The network device (103A, 103N) may be configured to receive the packets via the ports.

Additionally, the persistent storage in the network device may include any type of non-transitory computer readable medium that stores data. For example, the data in the persistent storage may be instructions, which, when executed by one or more processor(s) in the network device (103A, 103N), enable the network device (103A, 103N) to perform all or a portion of the functions described in accordance with one or more embodiments of the disclosure (see e.g., FIGS. 2A-3C).

In one embodiment of the disclosure, as discussed above, the network devices (103A, 103N) are multi-homed to the server (101). In particular, the network devices (103A, 103N) are multi-homed to one or more hosts executing on the server (101). In such a configuration, the network devices (103A, 103N) may use an Out-of-Band (OOB) channel to communicate (i.e., send and receive packets) with one another. In one or more embodiments, to establish an OOB connection between two network devices, a transmission control protocol (TCP) connection between the two network devices is first established. Once the TCP connection is established, the network devices create an OOB session by exchanging OOB session establishment messages.

Furthermore, all of the network devices (103A, 103N) may be configured to be load balanced to one another. Consequently, all of the network devices (103A, 103N) may use the same virtual router media access control (MAC) address and anycast Gateway Internet Protocol (IP). Thus, from the perspective of a host executing on the server (101), all of the network devices (103A, 103N) may be the same device.

In one or more embodiments disclosed herein, the network devices (103A, 103N) may be part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more devices (e.g., network devices (103A, 103N)) that facilitate network connectivity for one or more operatively connected devices (e.g., computing devices, data storage devices, other network devices, etc.). In one or more embodiments, the network device and other devices within the network (not shown) are arranged in a network topology (see e.g., FIG. 1A). In one or more embodiments, a network topology is an arrangement of various elements of a network.

Additional details about the network devices (103A, 103N) are described below with respect to FIG. 1B.

Figure 1B:
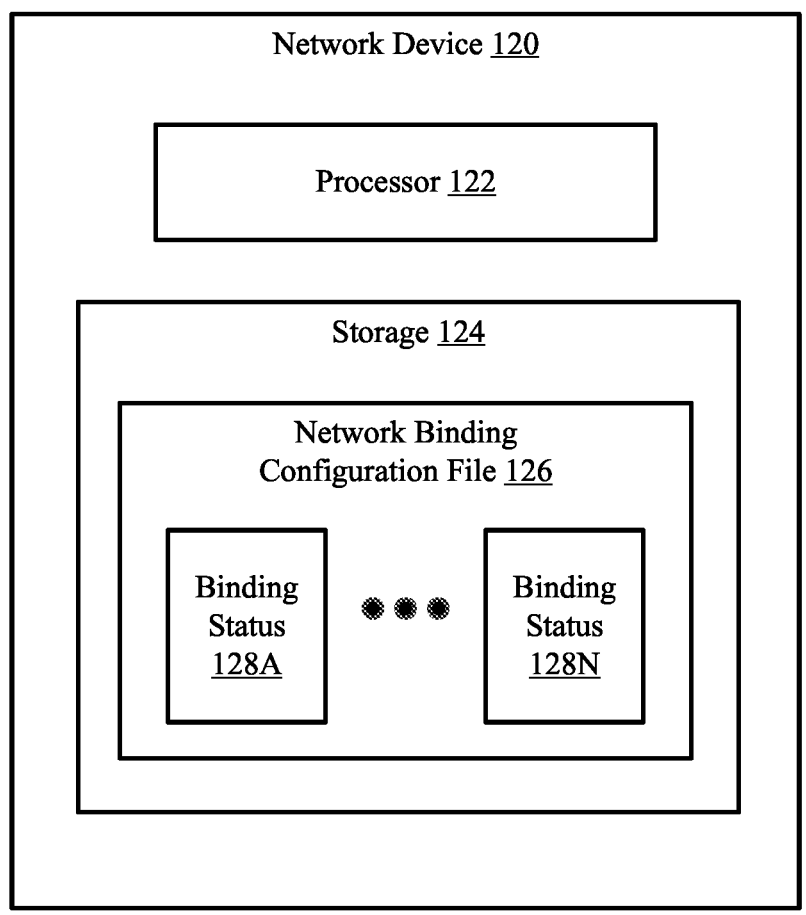
FIG. 1B shows a diagram of a network device in accordance with one or more embodiments disclosed herein.

In particular, turning now to FIG. 1B, FIG. 1B shows a network device (120) in accordance with one or more embodiments of the disclosure. The network device (120) may be any one of the one or more network devices (103A, 103N) discussed above. In addition to the components discussed above in reference to FIG. 1A, the network device (120) further includes a processor (122) and storage (124) (which may be any combination of volatile or persistent storage) storing a network binding configuration file (126). The network device (120) may include additional, fewer, and/or different components without departing from the disclosure. Each of the components illustrated in FIG. 1B is described below.

In one embodiment of the disclosure, the processor (122) may be a hardware processor including circuitry such as, for example, a central processing unit (CPU) or a microcontroller. The processor (122) may be other types of hardware devices for processing digital information without departing from the embodiments disclosed herein.

In one or more embodiments, the processor (122) is configured to execute one or more computing code (not shown) stored in storage of the network device (120) to enable the network device (120) to perform the functionalities discussed in the different portions of this disclosure (e.g., the processes discussed below in FIGS. 2A-3C).

In one or more embodiments disclosed herein, the storage (124) is implemented using devices that provide data storage services (e.g., storing data and providing copies of previously stored data). For example, storage (124) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more embodiments disclosed herein, storage (124) stores a network binding configuration file (126) that includes any number of binding statuses (128A, 128N). The network binding configuration file (126) may be implemented using one or more data structures. The data structures may include information regarding the status of a binding (e.g., binding statuses (128A, 128N)) between the network device (120) and the hosts, and may store any number of binding statuses (128A, 128N).

Each of the binding statuses (128A, 128N) in the network binding configuration file (126) may include information with regard to a binding between the network device (120) and a specific host executing on the server. For example, the binding statuses (128A, 128N) may include, but are not limited to: (i) an identifier (ID) of the host (e.g., an IP address); and (ii) a type of the binding. The binding status may include different and/or additional information without departing from the disclosure.

In one or more embodiments disclosed herein, the type of the binding may specify whether the binding is a static binding or a dynamic binding. In one or more embodiments, a dynamic binding indicates that the network device (120) is an owner of the ARP processing (also referred to as the ARP owner) between a specific host (e.g., Host A) executing on the server and all of the inter-connected load balanced network devices (of which the network device is a member). This configures the ARP owner as the sole network device that determines whether a binding between all of the inter-connected load balanced network devices and the specific host should be maintained and/or deleted. In one or more embodiments, the dynamic binding is periodically refreshed at a predetermined interval defined by a user (e.g., a network administrator). For example, once an age of the dynamic binding (i.e., the time elapsed since the binding was established) matches a time set for the preset interval (i.e., once the binding ages out), the ARP owner will execute a binding refresh (i.e., a refreshing of the aged out binding) and transmit a binding refresh request to the server in order to refresh the binding with specific host. In response to the binding refresh request, the host may transmit a binding refresh acknowledgement (via a packet)

In one or more embodiments disclosed herein, if the interface between the network device with the dynamic binding and a host becomes inactive (e.g., the network device is taken offline for maintenance purposes, the network device fails due to due to equipment failure, etc.), subsequent network traffic related to the host will instead be sent to one of the remaining load balanced network devices still in communication with the server. Consequently, instead of waiting for the removed network device to timeout and purge the binding for the host from all the other load balanced switches (i.e., a hitful event), the remaining load balanced switches will automatically reconfigure (i.e., a hitless event) their respective binding statuses based on which of the remaining load balanced switches receives the subsequent network traffic related to host. See e.g., FIGS. 2A-2C.

In one or more embodiments disclosed herein, a static binding indicates that the network device (120) is not the ARP owner. The static binding also does not need to be periodically refreshed. More specifically, network devices with the static binding status do not execute the binding refresh.

Figure 1C:
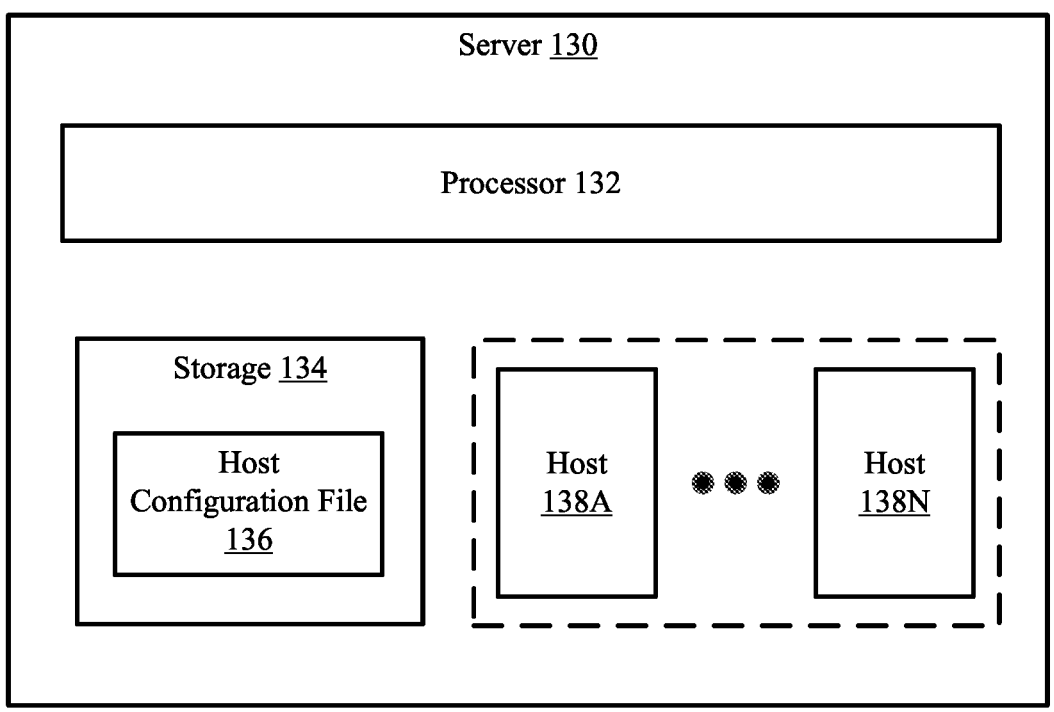
FIG. 1C shows a diagram of a server in accordance with one or more embodiments disclosed herein.

Turning now to FIG. 1C, FIG. 1C shows a server (130) in accordance with one or more embodiments of the disclosure. The server (130) may be the server (101) discussed above in FIG. 1A. In addition to the components discussed above in reference to FIG. 1A, the server (130) further includes a processor (132) and a storage (134) (which may be any combination of volatile or persistent storage) storing a host configuration file (136). The server (130) may also include any number of hosts (138A, 138N) (i.e., the hosts discussed above in FIG. 1A). Finally, the network device (130) may include additional, fewer, and/or different components without departing from the disclosure. Each of the components illustrated in FIG. 1C is described below.

In one embodiment of the disclosure, the processor (132) may be a hardware processor including circuitry such as, for example, a central processing unit (CPU) or a microcontroller. The processor (132) may be other types of hardware devices for processing digital information without departing from the embodiments disclosed herein.

In one or more embodiments, the processor (132) is configured to execute one or more computing code (not shown) stored in a persistent storage of the server (130) to enable the server (130) to perform the functionalities discussed in the different portions of this disclosure (e.g., the processes discussed below in FIGS. 2A-3C).

In one or more embodiments disclosed herein, the storage (134) is implemented using devices that provide data storage services (e.g., storing data and providing copies of previously stored data). For example, storage (134) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more embodiments disclosed herein, storage (134) stores the host configuration file (136). The host configuration file (136) may store information defining the parameters for each of the hosts (138A, 138N) executing on the server (130). More specifically, the host configuration file (136) may include a set of instructions for the server (130) (e.g., via the processor (132)) to set up each host (138A, 138N) such that each host (138A, 138N) can be executed on the server (130). In one or more embodiments, each host (138A, 138N) may include its own unique set of instructions in the host configuration file (136).

As discussed above in FIG. 1A, each of the hosts (138A, 138N) may be a virtual machine (VM) executing on the server (130) that utilizes the processor (132) and storage (134) of the server (130).

One skilled in the art will recognize that the architecture of the system (100), the network device (120), the server (130), and the network is not limited to the components shown in FIGS. 1A-1C. For example, the network may include any number and any type of network devices in communication with the server (101) and network devices (103A, 103N). Further, the network device (120) may include components not shown in FIG. 1B. Similarly, the server (130) may include components not shown in FIG. 1C.

Figure 2A:
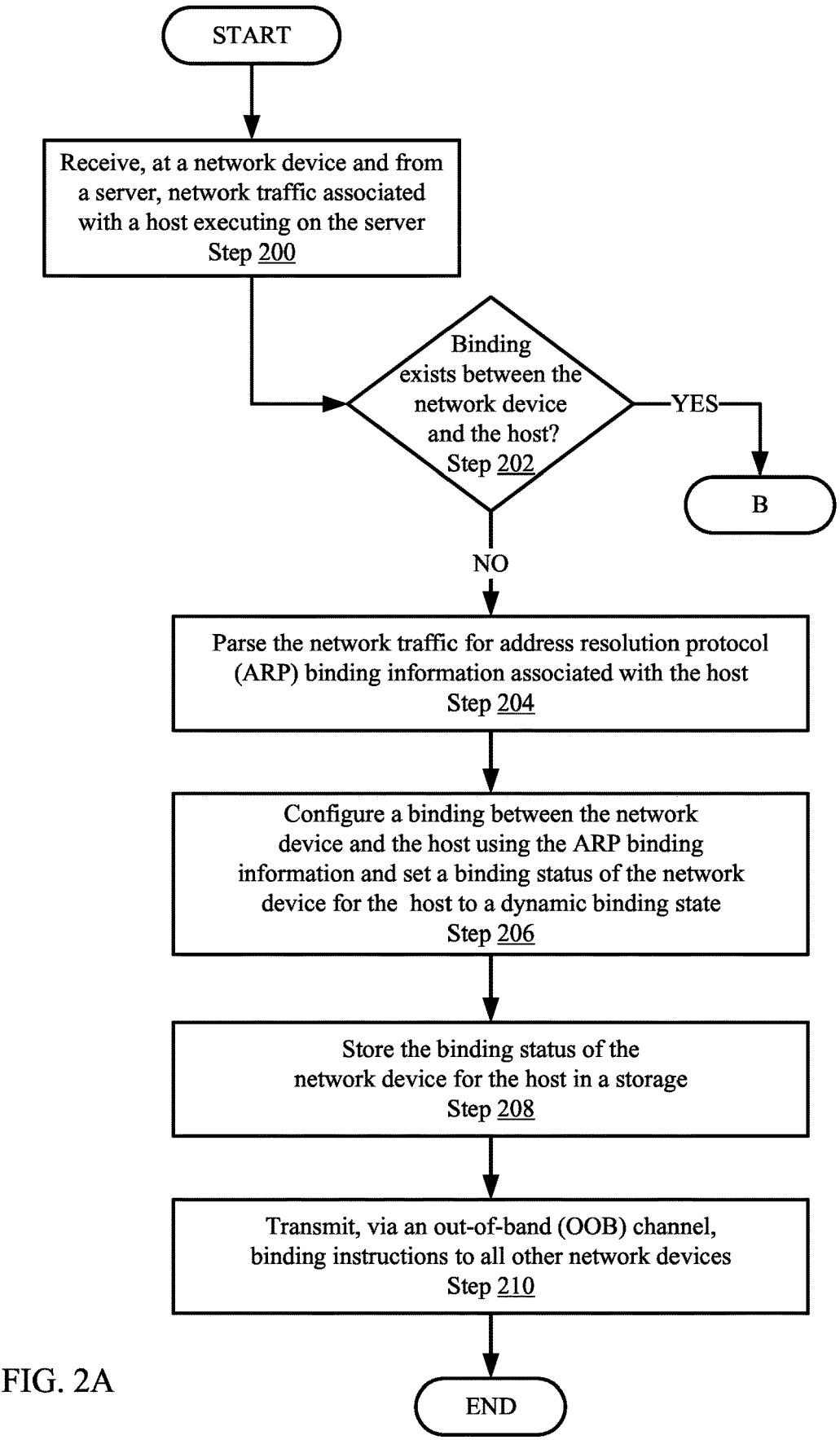
FIG. 2A shows a first part of a flowchart illustrating a host binding configuration process in accordance with one or more embodiments disclosed herein.
Figure 2B:
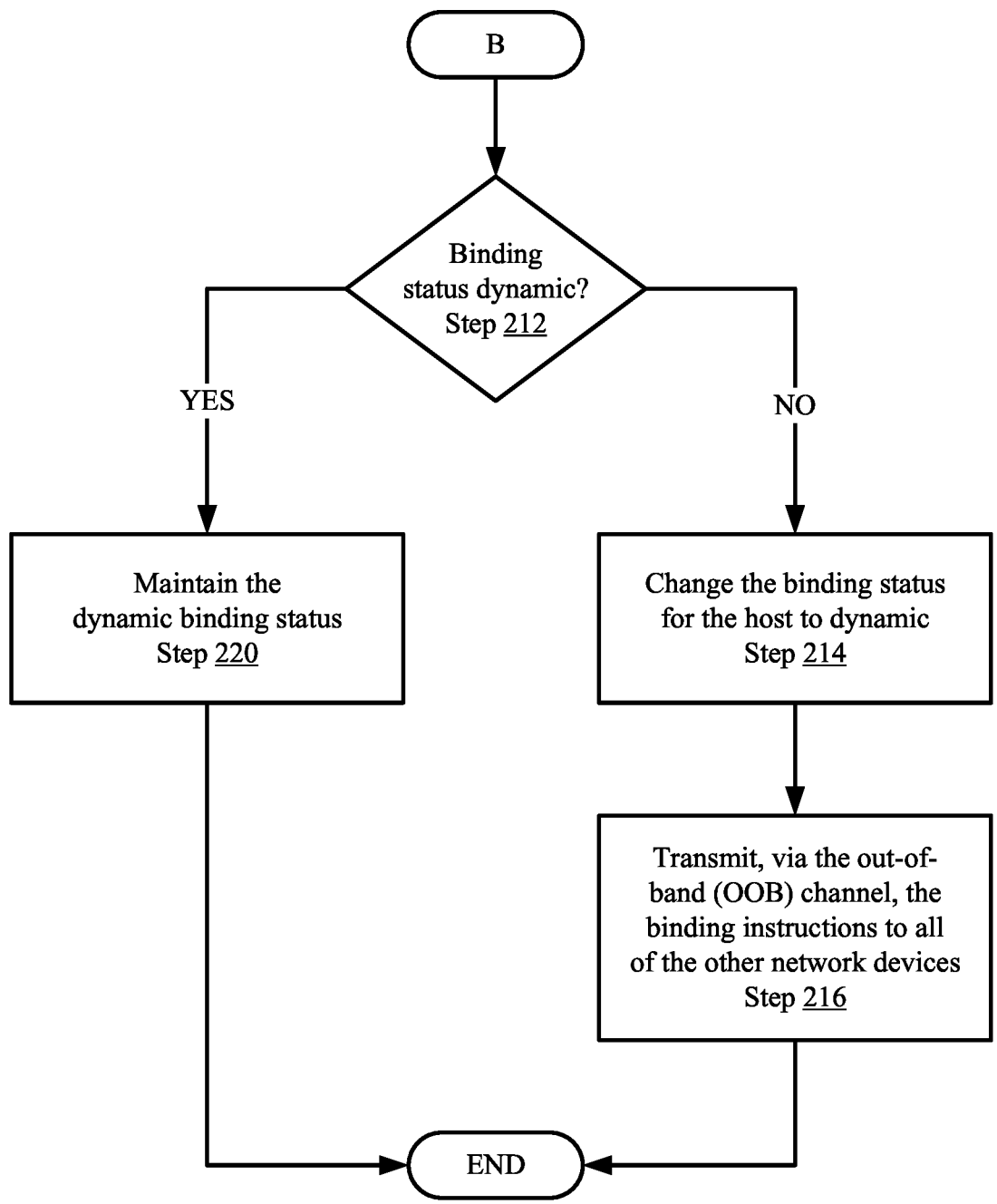
FIG. 2B shows a second part of the flowchart illustrating a host binding configuration process in accordance with one or more embodiments disclosed herein.

FIGS. 2A and 2B show a flowchart illustrating a binding process in accordance with one or more embodiments described herein. The method of FIGS. 2A and 2B may be performed by, for example, the network device (e.g., 120, FIG. 1B). Other components illustrated in FIGS. 1A and 1B may perform the method of FIGS. 2A and 2B without departing from the disclosure. Further, one or more steps in FIGS. 2A and 2B may be performed concurrently with one or more steps in FIGS. 2C-2E.

While the various steps in the flowchart shown in FIGS. 2A-2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a network device (e.g., 120, FIG. 1B) receives network traffic (e.g., packets) associated with a host executing on a server (e.g., 130, FIG. 1C). In one or more embodiments disclosed herein, the network traffic associated with the host may be a packet transmitted from the server. For example, the network traffic associated with the host may be packet including at least: (i) an identifier (ID) of the host; and (ii) binding information associated with the host. In one or more embodiments, the binding information may be address resolution protocol (ARP) binding information for configuring an ARP binding between the host and the network device.

In one or more embodiments disclosed herein, the network device may be a first network device among a group of network devices that are load balanced with one another. The server may be multi-homed to the group of network devices. In such a case, the binding information may be ARP binding information for configuring an ARP binding between the host and each network device in the group of network devices.

In Step 202, the network device determines whether a binding exists between the network device and the host executing on the server. In one or more embodiments, the network device makes this determination by parsing a network binding configuration file (e.g., 126, FIG. 1B) stored in a storage (e.g., 124) of the network device. In particular, the network binding configuration file may include a data structure specifying binding statuses of the network device with one or more hosts executing on the server.

If a binding exists between the network device and the host executing on the server (i.e., YES in Step 202), the method proceeds to Step 212 discussed below in FIG. 2B. However, if a binding does not exist between the network device and the host executing on the server (i.e., NO in Step 202), the method proceeds to steps 204 in FIG. 2A.

In Step 204, the network traffic associated with the host is parsed for the APR binding information associated with the host.

In Step 206, a binding (i.e., an ARP binding) is configured between the network device and the host using the ARP binding information. Furthermore, the network device sets a binding status of the network device for the host to a dynamic binding status. In one or more embodiments, in the context of Step 206, configuring a binding is to establish a new binding between the network device and the host. Furthermore, at this point in Step 206, the network device has become the ARP owner for the host.

In Step 208, the newly set binding status (i.e., the dynamic binding status) of the network device for the host executing on the server is stored in the storage of the network device. In particular, the new binding status of the network device is stored as a new entry within the network binding configuration file. As discussed above, the network binding configuration file may have as many binding status entries as the number of existing bindings between the network device and the hosts executing on the server.

In Step 210, the network device transmits binding instructions to all other network devices among the group of network devices with which it is load balanced. In one or more embodiments, the binding instructions are transmitted via an OOB channel established between the devices in the group of network devices. Furthermore, the binding instructions may include the ID of the host, instructions to configure (i.e., establish, maintain, or delete) a binding with the host, and instructions to set a binding status with the host to a static binding status.

Turning now to Step 212 of FIG. 2B, as a result of the network device determining that a binding does exist between the network device and the host executing on the server (i.e., YES in Step 202), the network device determines whether the binding status of the binding is a dynamic binding status. In one or more embodiments, this determination is made by parsing the network binding configuration file to find the entry corresponding to the binding between the network device and the host.

In response to determining that the binding status is a dynamic binding status (i.e., YES in Step 212), the dynamic binding status is maintained (in Step 220). In one or more embodiments, when the binding status is maintained, there is no change in any information related to the binding status between the network device and the host in the network binding configuration file. Alternatively, binding contents may need to be updated based on a content (e.g., the ARP binding information) of the network traffic associated with the host.

In contrast, in response to determining that the binding status is not a dynamic binding status (i.e., NO in Step 212), the network device is configured to change (in Step 214) the current binding status to the dynamic binding status. In particular, if the binding status is not dynamic (i.e., if the binding status is a static binding status), the binding status entry for the binding information associated with the host in the network binding configuration file is updated from the static binding status to the dynamic binding status. This change is then saved to the storage to generate an updated network binding configuration file reflecting the change. At this point, the network device has become the new ARP owner for the host.

In Step 216, similar to Step 210 and as the new ARP owner, the network device transmits binding instructions to all other network devices among the group of network devices it is load balanced with. In one or more embodiments, the binding instructions are transmitted via an OOB channel established between the group of network devices. Furthermore, the binding instructions may include the ID of the host, instructions to configure (i.e., establish, maintain, or delete) a binding with the host, and instructions to set a binding status with the host to a static binding status. The binding instructions may also include changes to binding content implemented in the network device.

Figure 2C:
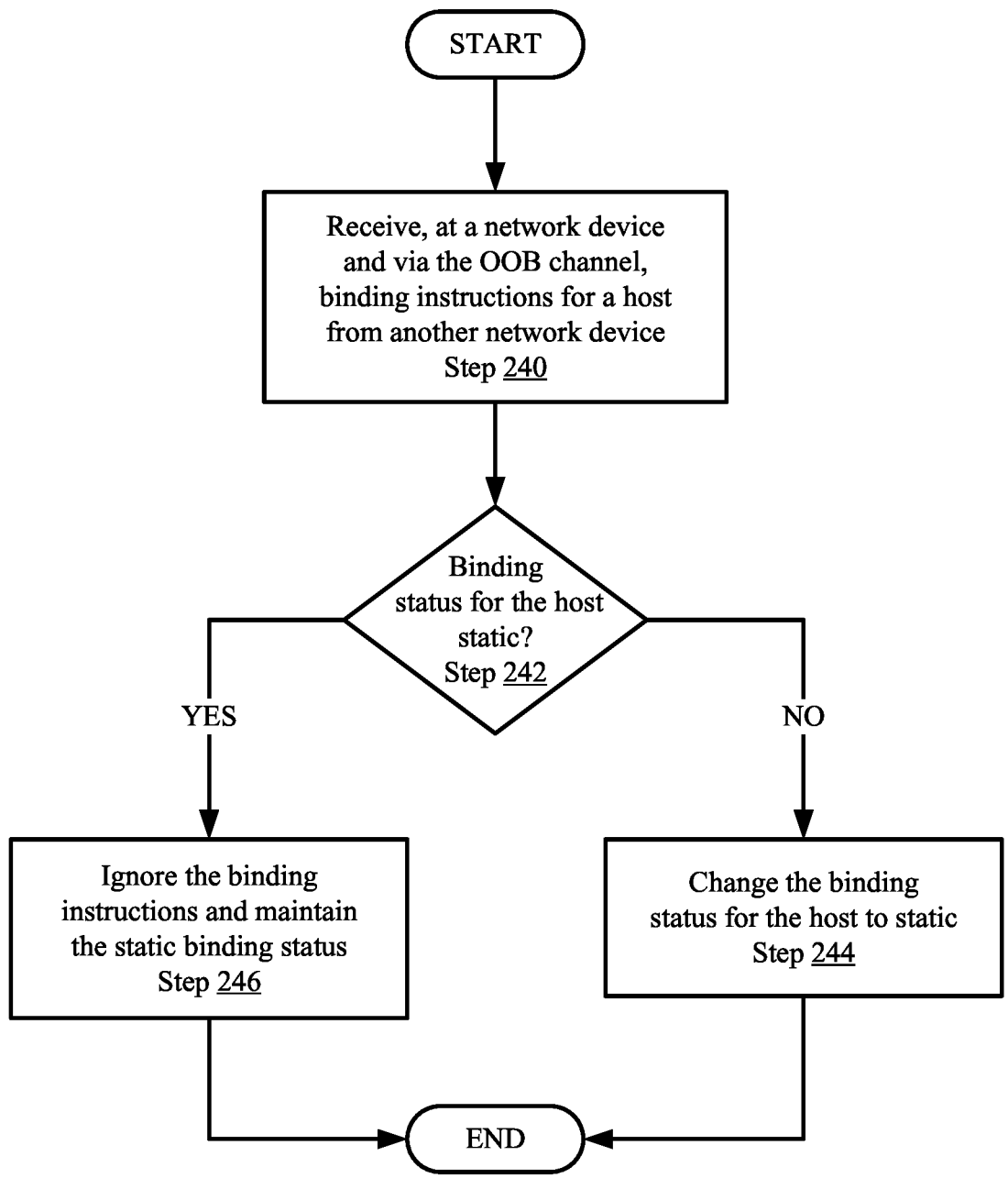
FIG. 2C shows a flowchart illustrating a host binding update process in accordance with one or more embodiments disclosed herein.

FIG. 2C shows a flowchart illustrating a binding update process in accordance with one or more embodiments described herein. The method of FIG. 2C may be performed by, for example, the network device (e.g., 120, FIG. 1B). Other components illustrated in FIGS. 1A and 1B may perform the method of FIG. 2C without departing from the disclosure. Further, one or more steps in FIG. 2C may be performed concurrently with one or more steps in FIGS. 2A-2B and 2D-2E.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, a network device (e.g., 120, FIG. 1B) receives binding instructions for a host from another network device (e.g., another of 120, FIG. 1B) via an OOB channel. The binding instructions may correspond to either of the binding instructions sent in Step 210 or Step 216. The network device receiving the binding instructions for the host may use the binding instructions to configure (i.e., establish, maintain, or delete) a binding between the network device and the host.

In Step 242, in response to receiving the binding instructions for the host, the network device determines whether the binding status of a binding with the host is the static binding status. In one or more embodiments, this determination is made by the network device parsing the network binding configuration file to find the entry corresponding to the binding between the network device and the host.

In response to determining that the binding status for the host is a dynamic binding status or does not exist (i.e., NO in step 242), the network device changes (or otherwise sets) (in Step 244) the binding status for the host in the network binding configuration file to the static binding status. This change is then stored in the storage to generate an updated network binding configuration file reflecting the changes.

In one or more embodiments, in Step 244, if the binding status for the host was changed from the dynamic binding status to the static binding status, the network device has effectively been removed as the ARP owner of the host, and will now no longer send APR request packets to the server in order to maintain the binding with the host. Furthermore, in Step 244, if the binding status for the host is not specified in the network binding configuration file, the network device will establish a new binding with the host by updating its binding status with the host to the static binding status.

In response to determining that the binding status for the host is static (i.e., YES in step 242), the network device ignores (in Step 244) the binding instructions for the host received from the other network device in Step 240. In other words, the network device does not change any information related to the binding status between the network device and the host in the network binding configuration file.

In one or more embodiments disclosed herein, if the binding instructions includes an updated internet protocol/ media access control (IP/MAC) binding information, the network device (in Step 244) may check whether it should update binding contents of the existing static binding. This inclusion of an updated IP/MAC may be associated with a host move procedure where the host executing on the server was moved to the server from a different server.

Figure 2D:
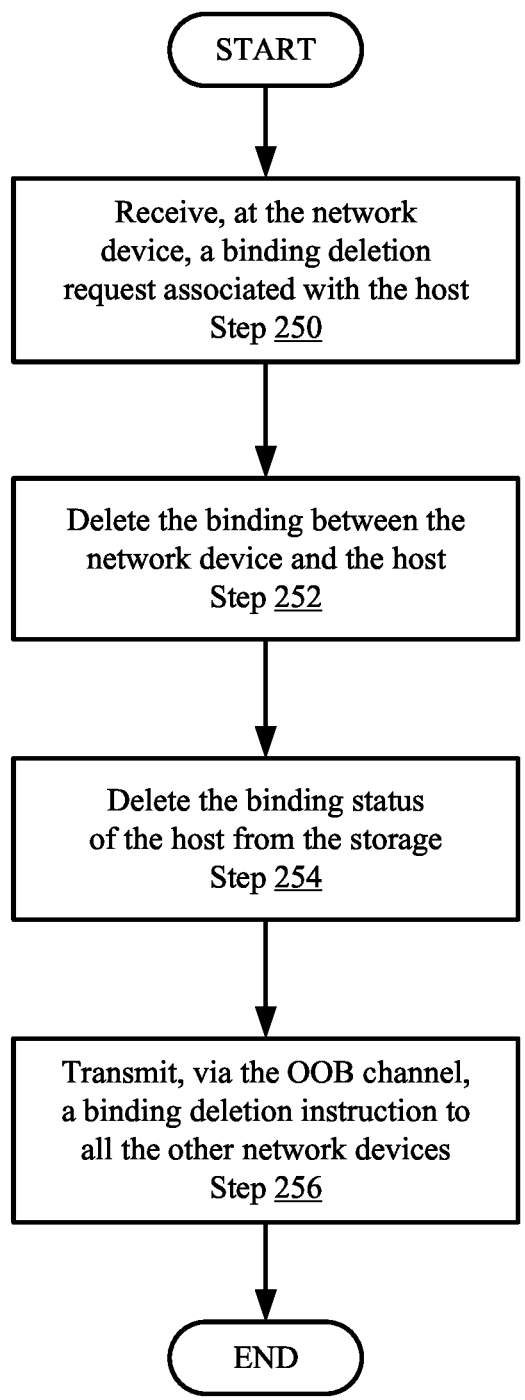
FIG. 2D shows a flowchart illustrating a host binding deletion process in accordance with one or more embodiments disclosed herein.

FIG. 2D shows a flowchart illustrating a binding deletion process in accordance with one or more embodiments described herein. The method of FIG. 2D may be performed by, for example, the network device (e.g., 120, FIG. 1B). Other components illustrated in FIGS. 1A and 1B may perform the method of FIG. 2D without departing from the disclosure. Further, one or more steps in FIG. 2D may be performed concurrently with one or more steps in FIGS. 2A-2C and 2E.

While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 250, a network device receives a binding deletion request associated with a host executing on a server. In one or more embodiments disclosed, the network device has an established ARP binding with the host prior to receiving the binding deletion request. The binding request may be transmitted by the server in the form of a packet including instructions for the network device to delete the ARP binding between the network device and the host executing on the server.

In Step 252, the network device deletes the ARP binding between the network device and the host executing on the server. In one or more embodiments disclosed herein, deletion of the ARP binding may include deleting all information in the network device's storage in relation to the host executing on the server. In other words, once the ARP binding is deleted, the network device will have no further association with the host executing on the server.

In Step 254, the binding status of the host executing on the server is deleted from the storage of the network device. In one or more embodiments disclosed herein, the deletion of the binding status may include the network device parsing the network binding configuration file in the storage and deleting all information in the network binding configuration file associated with the host. In one or more embodiments, all information associated with the host configured in the network device's software and/or hardware are also deleted.

In Step 256, the network device transmits a binding deletion instruction to all other network devices to which it is load balanced. In one or more embodiments disclosed herein, the binding deletion instruction is transmitted to each of the other load balanced network devices using the OOB channel, and the binding deletion instructions include instructions for each of these other network devices to delete their respective ARP bindings with the host executing on the server. In particular, because the network device received the binding deletion request directly from the server in Step 250, the network device includes the dynamic binding status with the host and is in-charge of maintaining the ARP bindings of the other network devices, all of which would have the static binding status with the host.

Figure 2E:
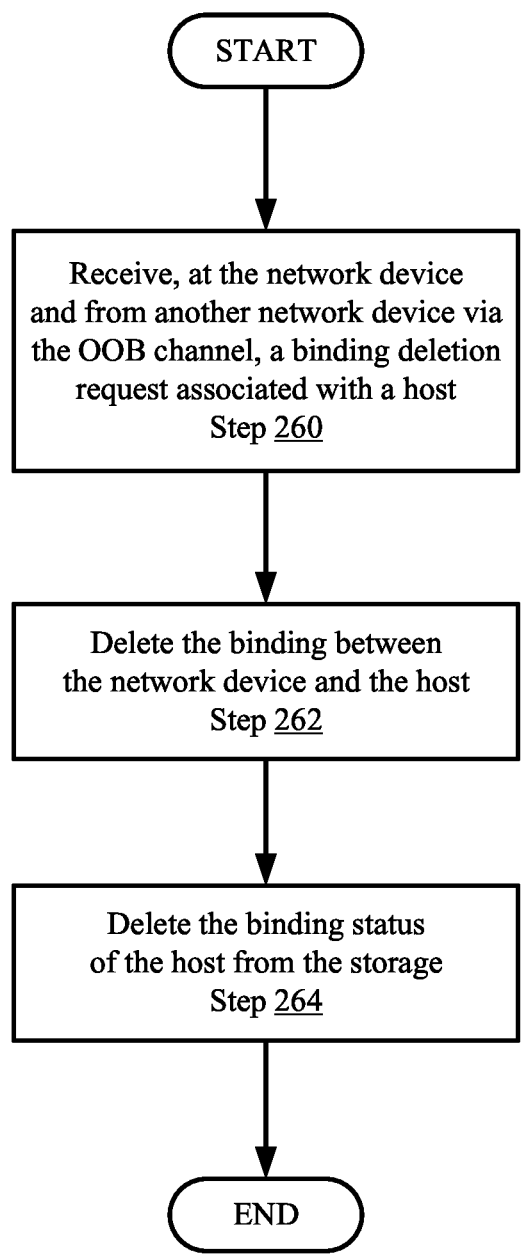
FIG. 2E shows another flowchart illustrating a host binding deletion process in accordance with one or more embodiments disclosed herein.

FIG. 2E shows a flowchart illustrating a host binding deletion process in accordance with one or more embodiments described herein. The method of FIG. 2E may be performed by, for example, the network device (e.g., 120, FIG. 1B). Other components illustrated in FIGS. 1A and 1B may perform the method of FIG. 2E without departing from the disclosure. Further, one or more steps in FIG. 2E may be performed concurrently with one or more steps in FIGS. 2A-2D.

While the various steps in the flowchart shown in FIG. 2E are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 260, a network device receives a binding deletion request (as a result of step 256) associated with a host executing on a server from another network device. In one or more embodiments disclosed herein, the network device receiving the binding deletion request has a static binding status with the host and the another network device that transmitted the request has a dynamic binding status with the host. The binding deletion request is transmitted to the network device via the OOB channel and includes instructions for the network device to delete its ARP binding with the host.

In Step 262, the network device deletes its ARP binding with the host executing on the server. In one or more embodiments disclosed herein, deletion of the ARP binding may include deleting all information in the network device's storage in relation to the host executing on the server. In other words, once the ARP binding is deleted, the network device will have no further association with the host executing on the server.

In Step 264, the binding status of the host executing on the server is deleted from the storage of the network device. In one or more embodiments disclosed herein, the deletion of the binding status may include the network device parsing the network binding configuration file in the storage and deleting all information in the network binding configuration file associated with the host. For example, information regarding the static binding status between the network device and the host is deleted from the network binding configuration file.

Figure 3A:
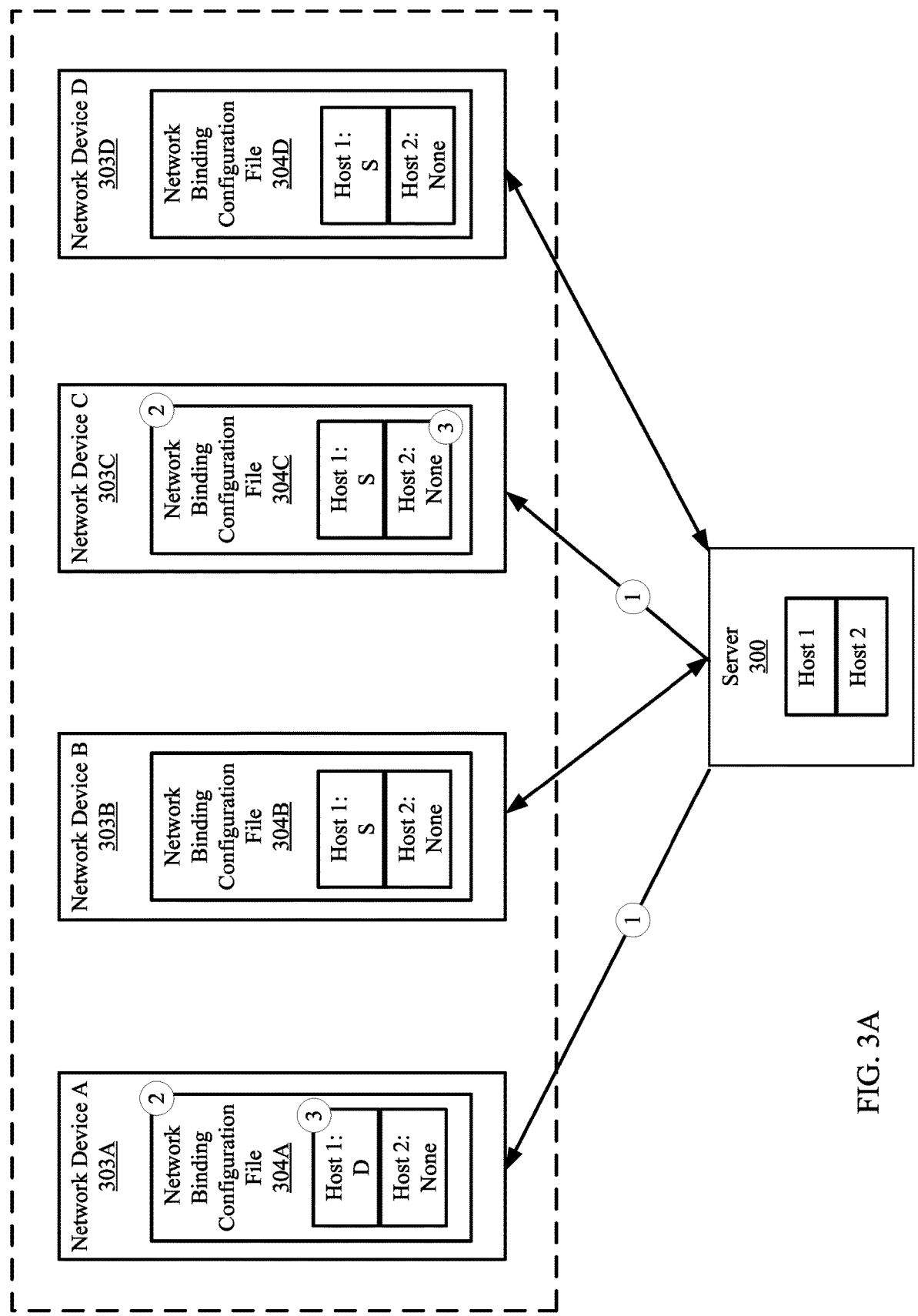
FIGS. 3A-3C show an example in accordance with one or more embodiments described herein.
Figure 3B:
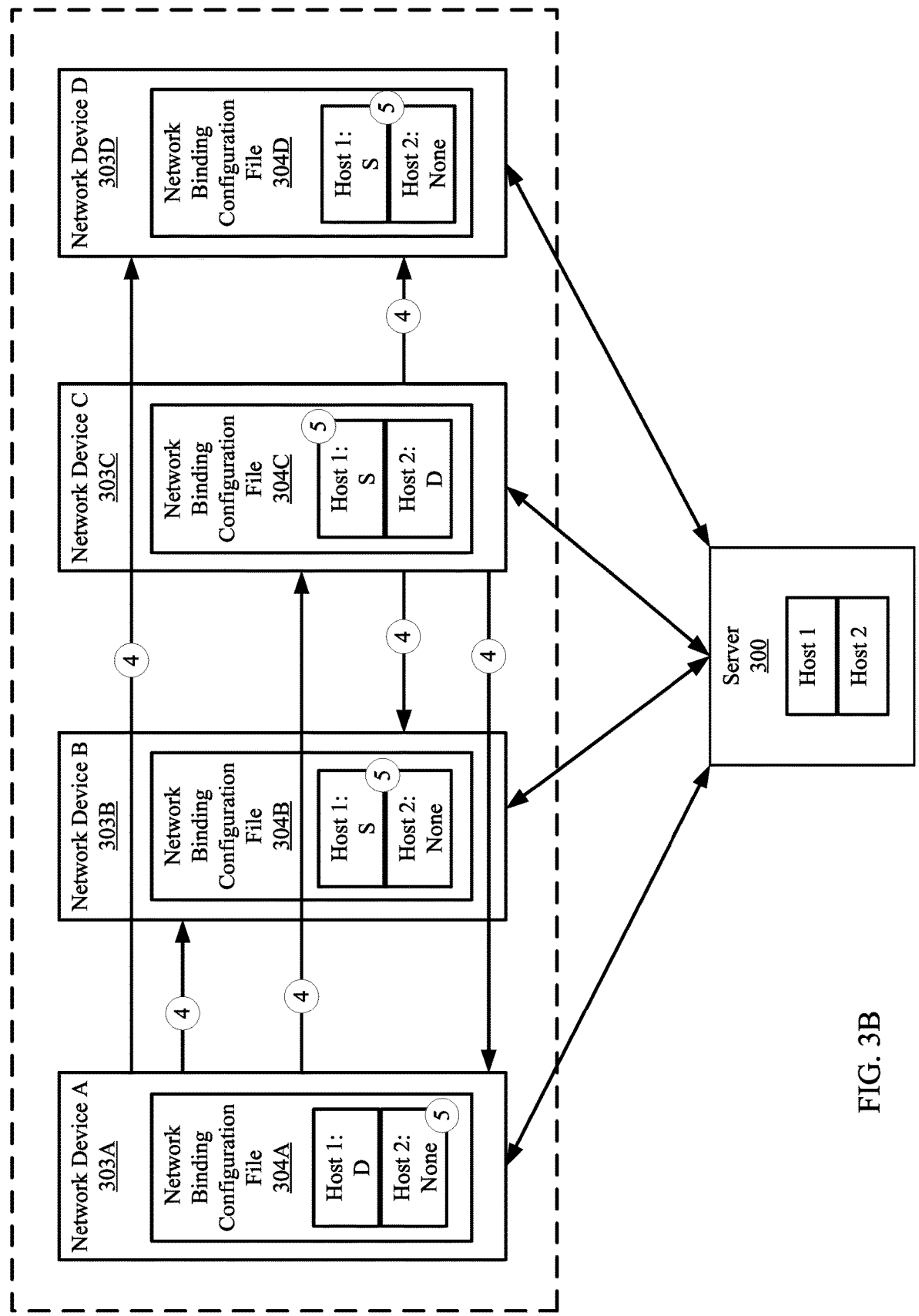
Figure 3C:
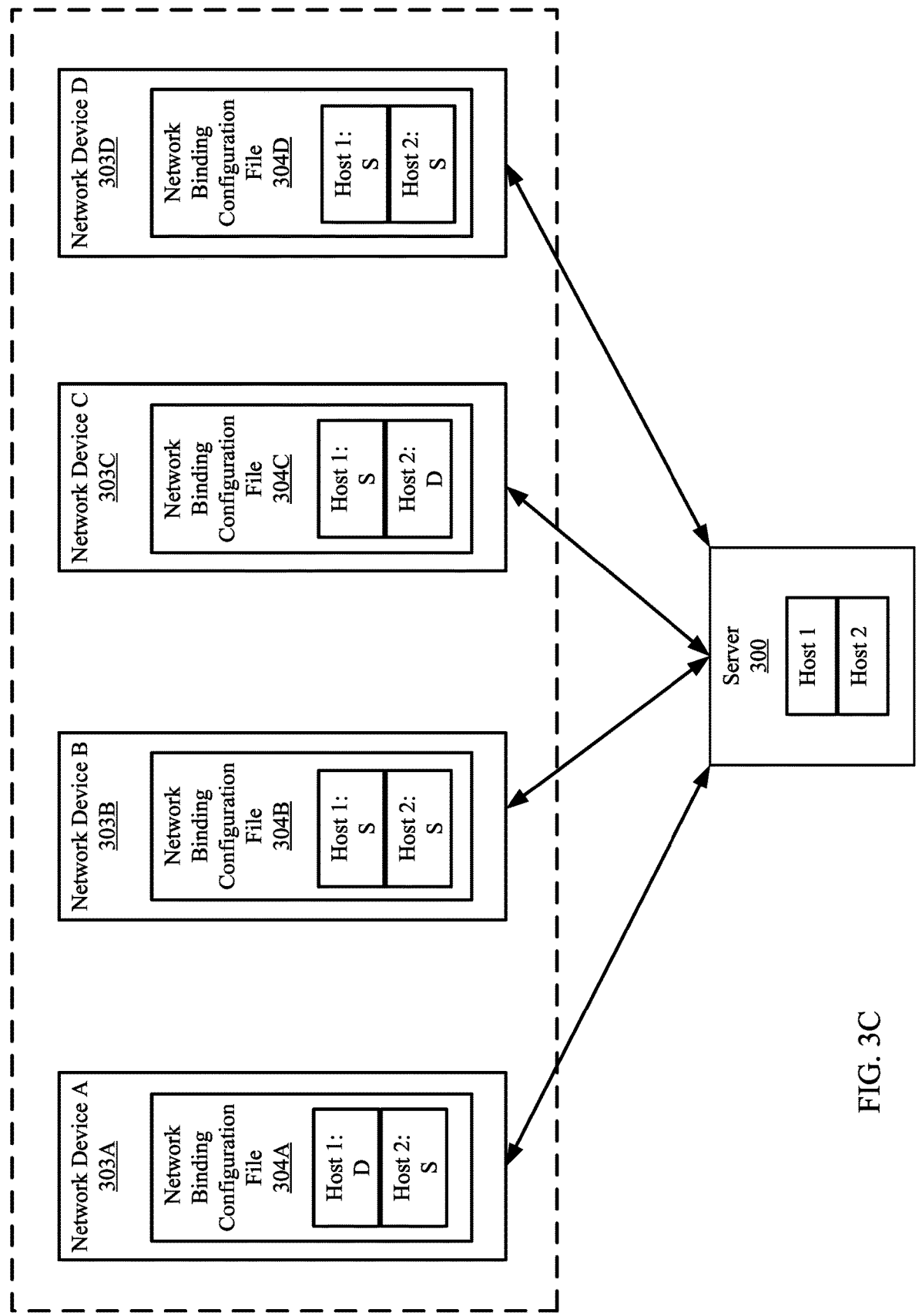

To further clarify embodiments disclosed herein, a non-limiting working example of configuring an ARP binding is provided in FIGS. 3A-3C. The working example is intended to highlight various aspects of the disclosure. However, the working example should not be construed as limiting the disclosure in any way.

Beginning of Working Example

Consider a scenario where a server (300) is multi-homed to four (4) load balanced network devices (303A-303D). Further consider that two hosts (i.e., Host 1 and Host 2) are executing on the server (300), and that the network devices (303A-303D) already have established APR bindings with Host 1.

In FIG. 3A, the server (300) transmits a binding refresh acknowledgement to network device A (303A) in response to a previously received binding refresh request for Host 1 from network device A (303A) [1]. The server also transmits ARP related network traffic to network device C (303C) to configure ARP bindings for Host 2 [1]. Upon receiving the respective packets from server (300), network device A (303A) checks its network binding configuration file (304A) for the binding status for Host 1 and network device C checks its network binding configuration file (304C) for the binding status for Host 2 [2]. Network device (303A) determines its binding status for Host 1 as the dynamic binding status (D) and maintains the dynamic binding status while network device (303C) determines its binding status for Host 2 is empty (i.e., not specified) and sets the binding status for Host 2 to the dynamic binding status [3].

Turning now to FIG. 3B, network device A (303A) transmits binding instructions via the OOB channel to instruct the other network devices (303B-303D) to set their respective binding status, with respect to Host 1, to the static binding status (S) [4]. Similarly, network device C (303C) transmits binding instructions via the OOB channel to instruct the other network devices (303A, 303B, 303D) to set their respective binding status, with respect to Host 2, to the static binding status [4]. The network devices (303A-303D) configure, in accordance with FIG. 2C, their bindings with respect to Host 1 and Host 2 and set their binding statuses for Host 1 and Host 2 in response to receiving the instructions via the OOB channel [5].

Finally, in FIG. 3C, the binding statuses have all been updated (i.e., modified or set) based on the instructions received via the OOB channel. In particular, network device A (303A) is maintained as the ARP owner of Host 1 and includes the only dynamic binding for Host 1. Furthermore, network device C (303C) is now set as the ARP owner of Host 2 and now includes the only dynamic binding for Host 2.

End of Working Example

Figure 4:
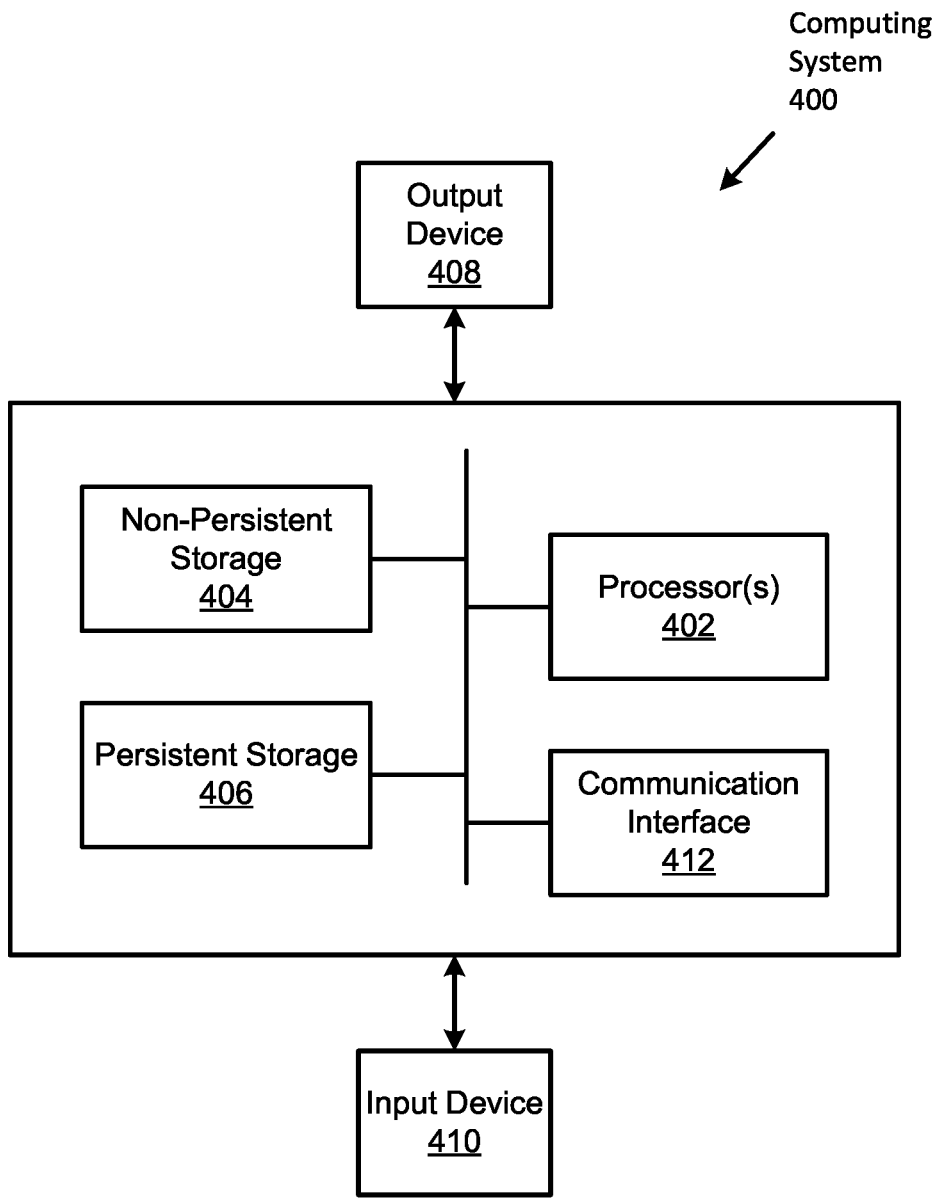
FIG. 4 shows a diagram of a computing device in accordance with one or more embodiments described herein.

As discussed above, embodiments of the disclosure may be implemented using computing devices. FIG. 4 shows a diagram of a computing device in accordance with one or more embodiments of the disclosure. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the disclosure, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein allow for an improved configuration of network bindings (i.e., APR bindings) between a multi-homed server and network devices (e.g., switches) connected to the multi-homed server. In particular, instead of having each network device service (i.e., maintain) its own APR binding status with a host executing on the multi-homed server, only one network device is in charge of servicing the ARP binding. This one network device is then configured to relay binding servicing instructions to the other network devices based on changes to its own binding with the host. Consequently, the quantity of communications required to service the bindings in all of the network devices may be greatly reduced. This directly improves each network device's computer functionalities (i.e., prevents unnecessary usage of each network device's computer resources) by preventing duplicative effort between the network devices to service their bindings with the host.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A network device configured to synchronize a binding process among a group of network devices connected to a server that is multi-homed to the group of network devices, the network device comprising:
    a storage; and
    a processor coupled to the storage, wherein
    the network device is a first network device among the group of network devices, and
    the processor is configured to:
        configure, using binding information associated with a host executing on a server, a binding between the first network device and the host and set a binding status of the first network device for the host to a first status; and
        transmit, in response to the setting of the binding status and to a second network device among the plurality of network devices, first binding instructions for causing the second network device to set a binding status of the second network device for the host.

2. The network device of claim 1, wherein
    the binding status of the second network device is set to a second status different from the first status,
    the first status is a dynamic binding status,
    the second status is a static binding status,
    with the dynamic binding status, the first network device executes a binding refresh with the host executing on the server at a predetermined interval, and
    with the static binding status, the second network device does not execute the binding refresh between the host executing on the server.

3. The network device of claim 1, wherein
    the host is one of a plurality of hosts executing in the server
    the binding information is included in a network traffic associated with the host that is transmitted from the server,
    the first binding instructions are transmitted via an out-of-band (OOB) channel, and
    the processor is further configured to:
        receive a binding refresh acknowledgement from the server for refreshing a binding between a second host among the plurality of hosts and the first network device;
        check a binding status of the first network device for the second host in response to receiving the binding refresh acknowledgement;
        configuring, in response to the checking and the receipt of the binding refresh acknowledgement, the binding status of the first network device for the second host; and
        transmit, in response to the updating and via the OOB channel to the second network device, second binding instructions for causing the second network device to set a binding status of the second network device for the second host.

4. The network device of claim 3, wherein, in response to receiving the binding refresh acknowledgement and determining that the binding status of the first network device for the second host is in the second status:
    configuring the binding status of the first network device for the second host comprises changing the binding status of the first network device for the second host from the second status to the first status, wherein
    the second binding instructions cause the second network device to set the binding status of the second network device for the second host to the second status.

5. The network device of claim 3, wherein, in response to receiving the binding refresh acknowledgement and determining that the binding status of the first network device for the second host is in the first status:
    configuring the binding status of the first network device for the second host comprises maintaining the binding status of the first network device for the second host as the first status, wherein
    the second binding instructions cause the second network device to set the binding status of the second network device for the second host to the second status.

6. The network device of claim 1, wherein, the processor is further configured to:
    receive a binding deletion request associated with the host from the server;
    delete, in response to receiving the binding deletion request, the binding between the host and first network device and the binding status of the first network device for the host; and
    transmit, via the OOB channel and to all other network devices among the group of network devices, binding deletion instructions to delete a binding between all the other network devices and the host.

7. The network device of claim 1, wherein the binding information is address resolution protocol (ARP) binding information.

8. A method for synchronizing a binding process among a group of network devices connected to a server that is multi-homed to the group of network devices, the method being executed by a first network device among the group of network devices and comprising:
    receiving, from the server, network traffic associated with a host executing on the server, wherein the network traffic comprises binding information associated with the host;
    configuring, using the binding information, a binding between the first network device and the host and setting a binding status of the first network device for the host to a first status; and transmitting, in response to the setting and via an out-of-band (OOB) channel to a second network device among the plurality of network devices, first binding instructions for causing the second network device to set a binding status of the second network device for the host to a second status different from the first status.

9. The method of claim 8, wherein
the first status is a dynamic binding status,
the second status is a static binding status,
with the dynamic binding status, the first network device executes a binding refresh with the host executing on the server at a predetermined interval, and
with the static binding status, the second network device does not execute the binding refresh between the host executing on the server.

10. The method of claim 8, wherein
the host is one of a plurality of hosts executing in the server, and
the method further comprises:
  receiving, by the first network device, a binding refresh acknowledgement from the server for refreshing a binding between a second host among the plurality of hosts and the first network device;
  checking a binding status of the first network device for the second host in response to receiving the binding refresh acknowledgement;
  configuring, in response to the checking and the receipt of the binding refresh acknowledgement, the binding status of the first network device for the second host; and
  transmitting, in response to the updating and via the OOB channel to the second network device, second binding instructions for causing the second network device to set a binding status of the second network device for the second host.

11. The method of claim 10, wherein, in response to receiving the binding refresh acknowledgement and determining that the binding status of the first network device for the second host is in the second status:
  configuring the binding status of the first network device for the second host comprises changing the binding status of the first network device for the second host from the second status to the first status, wherein
  the second binding instructions cause the second network device to set the binding status of the second network device for the second host to the second status.

12. The method of claim 10, wherein, in response to receiving the binding refresh acknowledgement and determining that the binding status of the first network device for the second host is in the first status:
  configuring the binding status of the first network device for the second host comprises maintaining the binding status of the first network device for the second host as the first status, wherein
  the second binding instructions cause the second network device to set the binding status of the second network device for the second host to the second status.

13. The method of claim 10, wherein the method further comprises:
  receiving, via the OOB channel and from the second network device, third binding instructions to update the binding status of the first network device for the second host;
  checking the binding status of the first network device for the second host in response to the receipt of the third binding update instructions; and
  updating the binding status of the first network device for the second host using the checked binding status.

14. The method of claim 13, wherein, the method further comprises by the first network device:
  ignoring, in response to the third binding instructions comprising instructions to set the binding status of the first network device for the second host to a second status and the binding status of the first network device for the second host being in the second status, the binding instructions and maintaining the second status.

15. The method of claim 13, wherein, the method further comprises by the first network device:
  changing, in response to the third binding instructions comprising instructions to set the binding status of the first network device for the second host to a second status and the binding status of the first network device for the second host being in the first status, the binding status of the first network device for the second host from the first status to the second status.

16. The method of claim 8, wherein the binding status of the first network device and the binding status of the second network device are associated with address resolution protocol (ARP) bindings between the host executing on the server and respective ones of the first network device and the second network device.

17. The method of claim 8, further comprising:
  receiving a binding deletion request associated with the host from the server;
  deleting, in response to receiving the binding deletion request, the binding between the host and first network device and the binding status of the first network device for the host; and
  transmitting, via the OOB channel and to all other network devices among the group of network devices, binding deletion instructions to delete a binding between all the other network devices and the host.

18. The method of claim 8, wherein the binding information is address resolution protocol (ARP) binding information.

19. A network device configured to synchronize an address resolution protocol (ARP) binding process among a group of network devices connected to a server that is multi-homed to the group of network devices, the network device comprising:
  a storage configured to store a network binding configuration file comprising a plurality of binding statuses; and
  a processor coupled to the storage, wherein
    the network device is a first network device among the group of network devices,
    a host is executing on the server, and
    the processor is configured to, in response to receiving network traffic associated with the host from the server:
      parse the network traffic associated with the host for binding information associated with the host;
      configure, using the binding information, a binding between the first network device and the host;
      setting, after configuring the binding, a binding status of the first network device for the host to a dynamic binding status, wherein setting the binding status of the first network device for the host to the dynamic binding status configures the first network device as an ARP owner for the host, and wherein the binding status of the first network device for the first host is stored as one of the plurality of binding statuses; and transmit, in response to setting the binding status of the first network device for the host to the dynamic binding status, to all other network devices among the group of network devices via an out-of-band (OOB) channel, binding instructions instructing each of the other network devices to:
configure a binding with the host; and
set a binding status, for the binding with the host, to a static binding status.

20. The network device of claim 19, wherein
with the dynamic binding status, the first network device executes a binding refresh with the host executing on the server at a predetermined interval, and
with the static binding status, each of the other network devices do not execute the binding refresh between the host executing on the server.

* * * * *